United States Patent [19]

Ward

[11] Patent Number: 4,653,995
[45] Date of Patent: Mar. 31, 1987

[54] APPARATUS FOR LOCKING A SPRUE BUSHING IN A MOLD ASSEMBLY

[75] Inventor: Joseph Ward, Wisconsin Dells, Wis.

[73] Assignee: Superior Die Set Corporation, Milwaukee, Wis.

[21] Appl. No.: 806,519

[22] Filed: Dec. 9, 1985

[51] Int. Cl.$^4$ ............................................. B29C 45/17
[52] U.S. Cl. .................. 425/190; 425/192 R; 425/567; 425/569
[58] Field of Search ............ 264/328.9; 425/185, 425/190, 192 R, 567, 569, 572, DIG. 51

[56] References Cited

U.S. PATENT DOCUMENTS

| | | | |
|---|---|---|---|
| 3,109,201 | 11/1963 | Dulmage | 425/567 |
| 3,443,001 | 5/1969 | Adair et al. | 264/328.9 |
| 3,677,682 | 7/1972 | Putkowski | 425/192 R |
| 3,698,849 | 10/1972 | Czerski | 425/567 |
| 3,897,929 | 8/1975 | Hartmann | 425/DIG. 51 |
| 4,289,473 | 9/1981 | Von Holdt | 425/567 |
| 4,428,725 | 1/1984 | Babiol | 425/567 |

Primary Examiner—Jay H. Woo
Assistant Examiner—Timothy W. Heitbrink
Attorney, Agent, or Firm—Michael, Best & Friedrich

[57] ABSTRACT

A locking ring for use in an injection molding machine and for securing a sprue bushing in place with respect to a mold plate assembly such that the sprue bushing is retained in place with respect to movement in the direction of the longitudinal axis of the sprue bushing bore, and from rotating in the bore.

6 Claims, 3 Drawing Figures

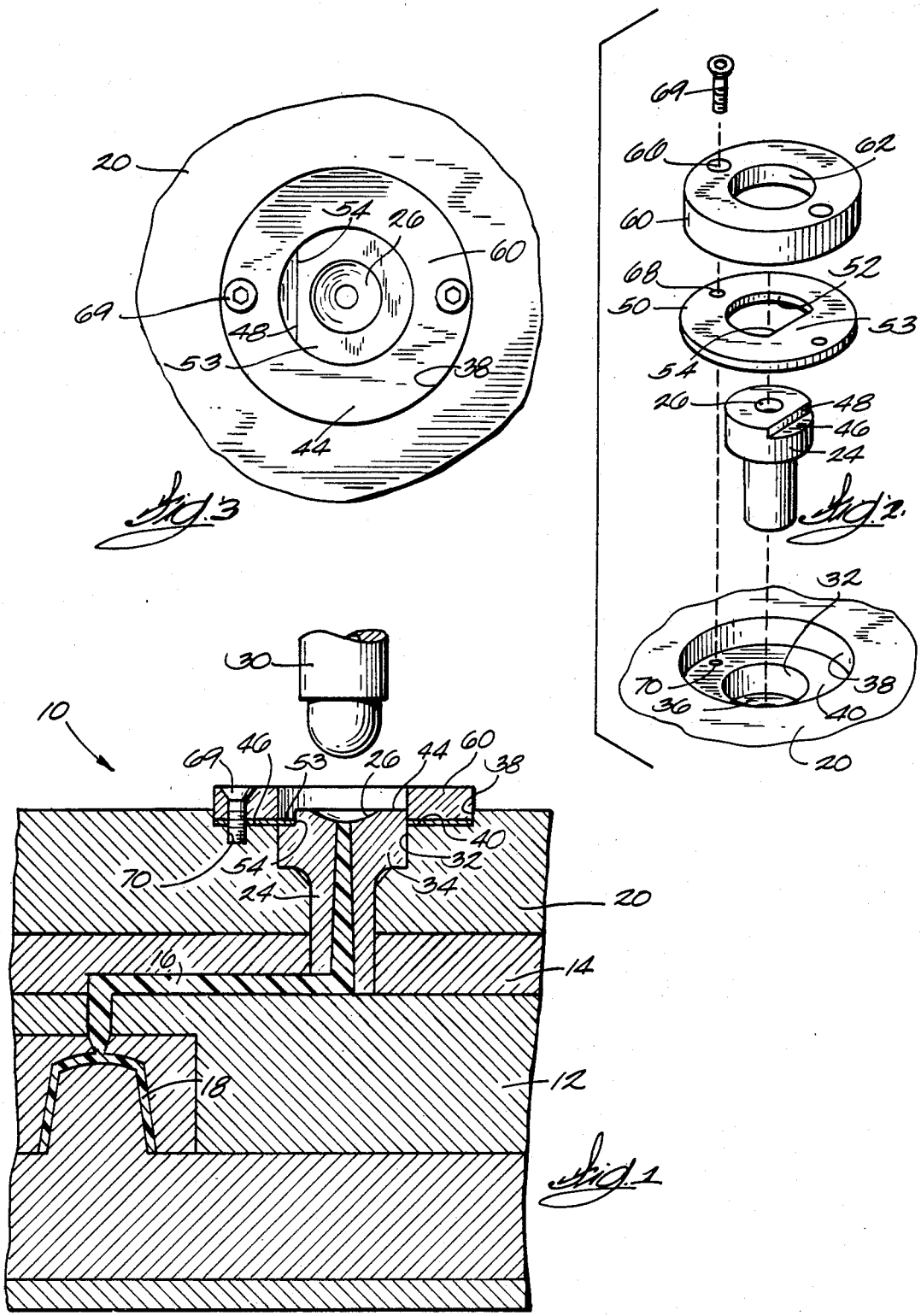

APPARATUS FOR LOCKING A SPRUE BUSHING IN A MOLD ASSEMBLY

FIELD OF THE INVENTION

The present invention is related to injection mold apparatus of the type including a sprue bushing and apparatus for use in securing the sprue bushing in place in a bore provided in a mold plate assembly.

BACKGROUND PRIOR ART

Injection molds commonly include a sprue bushing housed in a bore provided in one or more mold plates of the mold assembly. The sprue bushing extends through the mold plates and includes one end communicating with the mold cavity. An injection nozzle seats against one end of the sprue bushing, and the sprue bushing provides flow of molten material from the injection nozzle to the mold cavity. An example of such a mold apparatus is illustrated in the Von Holdt U.S. Pat. No. 4,289,473, issued Sept. 15, 1981. With such apparatus alignment of the relative position of the sprue bushing and the mold cavity is important to provide proper flow into the mold cavity. The sprue bushing commonly includes one or more discharge openings intended to be aligned with runners of the mold cavity. Misalignment of the discharge openings and the runners will result in improper or incomplete injection of plastic into the mold cavity.

One prior art method for securing the sprue bushing in place with respect to the mold plate is to provide the sprue bushing with a peripheral flange and to provide apertures in the peripheral flange such that bolts can extend through the flange and secure the sprue bushing to the mold plate.

In other prior art arrangements bores are drilled between the periphery of the sprue bushing and the mold plate, and dowels or keys are housed in the bores to secure the sprue bushing in place with respect to the mold plate.

Attention is also directed to the Hartmann U.S. Pat. No. 3,897,929; the Czerski U.S. Pat. No. 3,698,849; the Babiol U.S. Pat. No. 4,428,725; the Putkowski U.S. Pat. No. 3,677,682; the Adair et al. U.S. Pat. No. 3,443,001; and the Dulmate U.S. Pat. No. 3,109,201.

SUMMARY OF THE INVENTION

The invention is directed to an improved apparatus for use in securing a sprue bushing in place with respect to a mold plate assembly such that the sprue bushing is retained in place with respect to movement in the direction of the longitudinal axis of the sprue bushing bore, and the sprue bushing is also prevented from rotating in the bore such that the discharge outlets of the sprue bushing are maintained in alignment with the runners of the mold assembly.

More specifically, the invention includes an injection mold apparatus including a mold plate including a bore and, a sprue bushing housed in the bore, one of the opposite ends of the sprue bushing including a notch portion including a first shoulder surface generally parallel to the longitudinal axis of the bore and a second shoulder surface transverse to the longitudinal axis of the bore and intersecting the first shoulder surface. Means are also provided for securing the sprue bushing in the bore, this means including means for preventing the sprue bushing from rotating in the bore and secondly for preventing movement of the sprue bushing in the direction of the longitudinal axis of the bore. The means for securing includes a locking ring surrounding that end of the sprue bushing including the notch. The locking ring includes a central aperture having a first surface portion adapted to engage the first shoulder surface of the notch portion to prevent rotation of the sprue bushing with respect to the locking ring, and the locking ring includes a second surface portion adapted to engage the second shoulder of the sprue bushing to prevent longitudinal movement of the sprue bushing in the direction of the longitudinal axis of the bore. Means are further provided for securing the locking ring to the mold plate.

In one preferred embodiment of the invention the means for securing the locking ring to the mold plate includes at least one threaded fastener extending through the locking ring and securing the locking ring to the mold plate.

In one preferred embodiment of the invention the means for securing the locking ring to the mold plate includes a locating ring surrounding the end of the sprue bushing, the locking ring being housed between the locating ring and the mold plate.

In one preferred embodiment of the invention the means for securing the locking ring further includes a plurality of threaded fasteners extending through the locating ring and through the locking ring into the mold plate.

The invention also includes an injection mold apparatus comprising a mold plate having a generally planar face and a stepped bore including a longitudinal axis and a shoulder. A sprue bushing is housed in the stepped bore, and means are provided for locking the sprue bushing in the bore against rotation and against movement of the sprue bushing in the direction of its longitudinal axis. The means for locking includes a locking ring housed in a first portion of the bore and being secured to the shoulder, and the locking ring including a first surface portion adapted to engage a first surface portion of the sprue bushing to prevent rotation of the sprue bushing with respect to the mold plate and a second surface portion adapted to engage a second surface portion of the sprue bushing to prevent movement of the sprue bushing in the direction of the longitudinal axis with respect to the mold plate. Means are also provided for securing the locking ring to the mold plate.

One of the principal advantages of applicant's invention is that the combination of the sprue bushing construction and the locating ring arrangement produces a means for securing the sprue bushing in place which is substantially less expensive to fabricate than prior art arrangements. Additionally, applicant's arrangement can be used in a variety of applications. The sprue bushing can be effectively secured in place with no machining required to the mold base and with only a slight modification of the sprue bushing to produce a flat on the sprue bushing complementary to the flat provided on the aperture of the sprue bushing locking ring.

Various other features and advantages of the invention will be apparent by reference to the following description of a preferred embodiment, to the drawings and to the claims.

BRIEF DESCRIPTION OF THE DRAWINGS

FIG. 1 is a cross section elevation view of a mold assembly embodying the present invention.

FIG. 2 is an exploded perspective view of the mold apparatus illustrated in FIG. 1.

FIG. 3 is a view taken along line 3—3 in FIG. 1.

Before describing the invention in detail it is to be understood that the invention is not limited in its application to the details of construction and to the arrangement of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF A PREFERRED EMBODIMENT

Illustrated in FIG. 1 is an injection mold assembly 10 including a mold block 12 and a mold plate 14 defining a runner 16 adapted to supply molten plastic to mold cavities 18 defined by the mold block 12. The mold assembly 10 also includes a mold clamping plate 20, and the mold plate 14 and mold clamping plate 20 define a bore 22 adapted to house a sprue bushing 24. As is conventional, the sprue bushing 24 is generally cylindrical and is housed in the bore 22 defined by the mold plate 14 and the mold clamping plate 20 and includes a central bore 26 communicating through an opening 28 with the runner 16 and adapted to provide flow of molten plastic to the runner 16. The sprue bushing 24 is also intended to receive an end of a conventional plastic injection nozzle 30.

While the mold assembly 10 could have other constructions, in the particular arrangement shown in the drawings, the bore 22 extending through the mold clamping plate and adapted to house the sprue bushing 24 is stepped and includes a first recessed portion 32 adapted to house a large diameter portion 34 of the sprue bushing 24, the first recessed portion 32 including a first annular shoulder 36. The stepped bore 22 further includes a second recessed portion 38 with a second annular shoulder 40 between the first recessed portion 32 and the second recessed portion 38.

In the illustrated arrangement the sprue bushing 24 housed in the bore 22 includes an end face 44 have a periphery which is notched on one side so as to form a shoulder 46, and a surface 48 which in the illustrated form of the invention defines a plane parallel to the longitudinal axis of the sprue bushing and perpendicular to the end face 44 of the sprue bushing.

Means are also provided for locking the sprue bushing 24 in place with respect to the mold clamping plate 20 to prevent the sprue bushing 24 from backing out of the stepped bore 22 and to prevent rotation of the sprue bushing 24 in the stepped bore with respect to the mold clamping plate. The means for locking the sprue bushing in place includes a locking ring 50 (best shown in FIG. 2) adapted to be housed in the second recess 38 in the mold clamping plate 20 and against the shoulder 40. The locking ring 50 comprises a thin generally circular disk having a central aperture 52 and being adapted to surround the end of the sprue bushing. The central aperture 52 of the locking ring 50 is generally circular but includes a chord portion 53 having a linear surface 54 adapted to engage the flat surface 48 of the sprue bushing 24 so in opposed facing relation as to prevent the sprue bushing 24 from rotating with respect to the locking ring 50. The chord portion 53 of the locking ring 50 also engages the planar shoulder surface 46 of the sprue bushing 24 to prevent the sprue bushing 24 from backing out of the bore 22.

The means for securing the sprue bushing 24 in place also includes an annular locating ring 60 adapted to be housed in the recess 38 in the mold clamping plate 20 and for clamping the locking ring 50 against the shoulder 40 of the recess and against the surface 46 of the sprue bushing 24. The locating ring 60 includes a central circular bore 62 having an inside diameter slightly larger than the outside diameter of the upper end of the sprue bushing 24 such that the locating ring 60 can surround the upper end of the sprue bushing 24.

The locating ring 60 and locking ring 50 also each include apertures 66 and 68, respectively, whereby bolts 69 can extend through these apertures into threaded bores 70 provided in the mold clamping plate 20 to thereby clamp the locating ring 60 and the locking ring 50 in place with respect to the mold clamp plate 20 and with respect to the sprue bushing 24.

Various features of the invention are set forth in the following claims.

I claim:

1. An injection mold apparatus comprising:

a mold plate including a bore having a longitudinal axis, a sprue bushing housed in said bore, said sprue bushing having a generally cylindrical outer end including a notch formed therein, said notch including a first surface portion generally parallel to said longitudinal axis of said bore, said first surface portion defining a chord extending across said cylindrical outer end and a shoulder portion defining a plane transverse to said longitudinal axis of said bore and intersecting said first surface portion, means for securing said sprue bushing in said bore, said means for securing including means for preventing said sprue bushing from rotating in said bore and for preventing movement of said sprue bushing in said bore in the direction of said longitudinal axis, said means for securing including a locking ring, said locking ring being a generally circular disc positioned against said mold plate and including a central aperture housing at least a portion of said generally cylindrical outer end of said sprue bushing, said central aperture including a planar surface portion adapted to engage said first surface portion of said shoulder portion to prevent rotation of said sprue bushing with respect to said locking ring, and said locking ring including a chord portion adapted to engage said shoulder portion of said sprue bushing to prevent longitudinal movement of said sprue bushing in the direction of said longitudinal axis of said bore and means for securing said locking ring to said mold plate.

2. An injection mold apparatus as set forth in claim 1 wherein said means for securing said locking ring to said mold plate includes at least one threaded fastener extending through said locking ring and securing said locking ring to said mold plate.

3. An injection mold apparatus as set forth in claim 1 wherein said means for securing said locking ring to said mold plate includes a locating ring housed in said bore in said mold plate such that said locking ring is housed between said locating ring and said mold plate.

4. An injection mold apparatus as set forth in claim 3 wherein said means for securing said locking ring further includes a plurality of threaded fasteners extending through said locating ring and through said locking ring into said mold plate.

5. An injection mold apparatus as set forth in claim 1 wherein said bore in said mold plate is stepped and includes a first bore portion and a large diameter bore portion, said first bore portion and said large diameter portion being joined by a shoulder, and wherein said locking ring is housed in said large diameter portion of said bore and is secured against said shoulder of said bore.

6. A sprue bushing shim for use in an injection mold assembly, said sprue bushing shim including a mold plate having a bore, said bore having a longitudinal axis, and a sprue bushing adapted to be housed in said bore, said sprue bushing including a generally cylindrical outer end and a notch formed in the cylindrical outer end, the notch including a first surface portion generally parallel to said longitudinal axis and defining a chord extending across the cylindrical outer end of the sprue bushing and a shoulder portion defining a plane transverse to the longitudinal axis of the sprue bushing and intersecting the first surface portion, the sprue bushing shim comprising a generally circular disc adapted to be secured to the mold plate and adapted to engage the sprue bushing for securing the sprue bushing against rotation with respect to the mold plate and for preventing movement of the sprue bushing out of the bore, the generally circular disc including a central aperture adapted to house the outer end of the sprue bushing, the central aperture including a generally planar surface portion adapted to engage said first surface portion of the notch of the sprue bushing in opposed facing relation to prevent rotation of the sprue bushing with respect to the mold plate, and the generally circular disc including a chord portion adapted to engage the second surface portion of the notch of the sprue bushing to prevent movement of the sprue bushing out of the bore.

* * * * *